United States Patent [19]

Shoji et al.

[11] Patent Number: 5,745,785
[45] Date of Patent: Apr. 28, 1998

[54] SYSTEM FOR ALTERNATIVELY TRANSFERRING DATA FROM EXTERNAL MEMORY TO MEMORY DEVICE AND FROM MEMORY DEVICE TO INTERNAL MEMORY DEPENDING UPON PROCESSING UNIT'S OPERATIONAL

[75] Inventors: Wataru Shoji; Daisuke Tabuchi; Ichiro Nakajima, all of Tokyo, Japan

[73] Assignee: Sofmap Future Design, Inc., Tokyo, Japan

[21] Appl. No.: 643,131

[22] Filed: May 2, 1996

[30] Foreign Application Priority Data

May 9, 1995 [JP] Japan ................................. 7-134683

[51] Int. Cl.⁶ ............................. G06F 13/14; G06F 13/38
[52] U.S. Cl. ................................... 395/827; 395/840
[58] Field of Search .................... 364/900; 395/250, 395/425, 840, 827

[56] References Cited

U.S. PATENT DOCUMENTS

| | | | |
|---|---|---|---|
| 4,298,954 | 11/1981 | Bigelow et al. | 364/900 |
| 4,303,988 | 12/1981 | Tsuboka et al. | 364/900 |
| 5,111,385 | 5/1992 | Hattori | 395/425 |
| 5,121,480 | 6/1992 | Bonke et al. | 395/250 |

FOREIGN PATENT DOCUMENTS 0 018 518  11/1980  European Pat. Off. .

OTHER PUBLICATIONS

E. Horowitz, S. Sahni, and S. Anderson–Freed, *Fundamentals of Data Structures*, Freeman and Company, 1991, pp. 378–385.

*Primary Examiner*—Thomas C. Lee
*Assistant Examiner*—David Ton
*Attorney, Agent, or Firm*—H. C. Chan

[57] ABSTRACT

A system for high speed data transfer between an external memory and internal memory of a computer is disclosed. The system contains a CPU, two memory devices, a first circuit for communicating data with the external memory, a second circuit for communicating data with the internal memory, a data switch for alternatively connecting the two memory devices to the first and the second circuit, and a software routine. The software routine causes the data switch to couple one of the memory devices to the internal memory when the CPU is available to process data. The software routine also causes an application program to be executed by the CPU when data is transferred between the external memory and one of the memory devices.

8 Claims, 6 Drawing Sheets

SYSTEM FOR ALTERNATIVELY TRANSFERRING DATA FROM EXTERNAL MEMORY TO MEMORY DEVICE AND FROM MEMORY DEVICE TO INTERNAL MEMORY DEPENDING UPON PROCESSING UNIT'S OPERATIONAL

FIELD OF THE INVENTION

The present invention relates to computer systems, and more particularly relates to methods and devices for high speed transferring of data between an external memory device and internal memory of a computer.

BACKGROUND OF THE INVENTION

When computers were first developed, they were primarily being used to perform complex mathematical operations. For example, computers were used to solve fluid dynamic equations to predict weather condition, kinetic equations to determine the trajectory of rockets and satellites, and linear programming equations to find the most efficient way to distribute goods. These types of computation typically require a small amount of input data, many hours of complex computation in random access memory, and output a small number of data. The input and output of data involve peripheral devices, such as keyboard, cards, and floppy or hard disks. Because there is little activities in input and output, bottleneck in performance is due to the lack of computational power of the computer instead of the data transfer speed between the computer and peripheral devices.

As computers become widely available, they are being used to handle commercial and home entertainment applications. They are used to process text, spread sheets, databases, games, digital audio signals, graphics, movie, etc. Most of these applications require the transferring of a large amount data between the computer and peripheral devices. For example, the size of many uncompressed graphic file is close to a million bytes and video files could be over ten million bytes. These files are typically stored in storage devices external to a CPU (central processing unit) and its associated main memory. Examples of external storage devices are hard disk, removable disk (e.g., those marketed by Syquest Technology, Inc. and Iomega Corp.) and CDROM.

Data transfer between these external storage devices and the computer's internal semiconductor memory is slow. When the size of the files become large, it takes an intolerable amount of time to load and retrieve data from the external storage device. As a result, the performance of the system decreases.

There are attempts to improve performance by making the peripheral devices run faster and the CPU more powerful. So far, these attempts only achieve marginal improvement in overall performance. Consequently, there is a need to develop a system that can bring about better improvement.

SUMMARY OF THE INVENTION

The present invention involves methods and devices for high speed transfer of data between an external memory device and internal memory of a computer. The high speed data transfer device comprises a first memory, a second memory, a first circuit for communicating data with the external memory device, and a second circuit for communicating data with the internal memory. The device also comprises a data switching circuit which alternative couples the first circuit to one of the first and second memories and alternatively couples the second circuit to the remaining one of the first and second memories. When the first circuit is coupled to the first or second memory, data is transferred between the external memory device to the first or second memory, respectively. When the second circuit is coupled to the first or second memory, data is transferred between the first or second memory, respectively.

One of the advantages of the above data transfer device is that the first and second circuits can perform different data transfer operation concurrently. For example, the external memory device can transfer data to the first memory while the internal memory can transfer data from the second memory. When the first memory is full, the second memory is empty. The external memory can then be switch to the second memory. Consequently, the external memory can continue to transfer data to the second memory while the internal memory can continue to transfer data from the first memory. As a result, data can be transferred between the external memory device and the internal memory almost continuously.

In a preferred embodiment, the first memory, the second memory and the internal memory are semiconductor devices. Because the external memory device is a mechanical device, the time required for data transfer is long. Thus, data transfer from and to the internal memory would be completed while the external memory device is still in operation. Because the external memory device is controlled by the data transfer device of the present invention, the CPU of the computer would normally be sitting idle. One aspect of the present invention is a method for utilizing the idle CPU time.

The data transfer device further comprises means for generate status signals related to the data switching. A software driver responsive to the status signal can allow other software programs to run during the time period the CPU is not needed for data transfer. As a result, the CPU would not be sitting idle.

Because the inventive data transfer device and the inventive software driver act synergically in speeding up program execution involving external memory device access, the inventive software should be used to replace conventional drivers (such as IBM personal computer's BIOS hard disk device service routine).

These and other features and advantages can be understood from the following detailed description of the invention together with the accompanying drawings.

DETAILED DESCRIPTION OF THE INVENTION

The present invention is directed to a novel system for transferring data between a computer and external memory devices. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
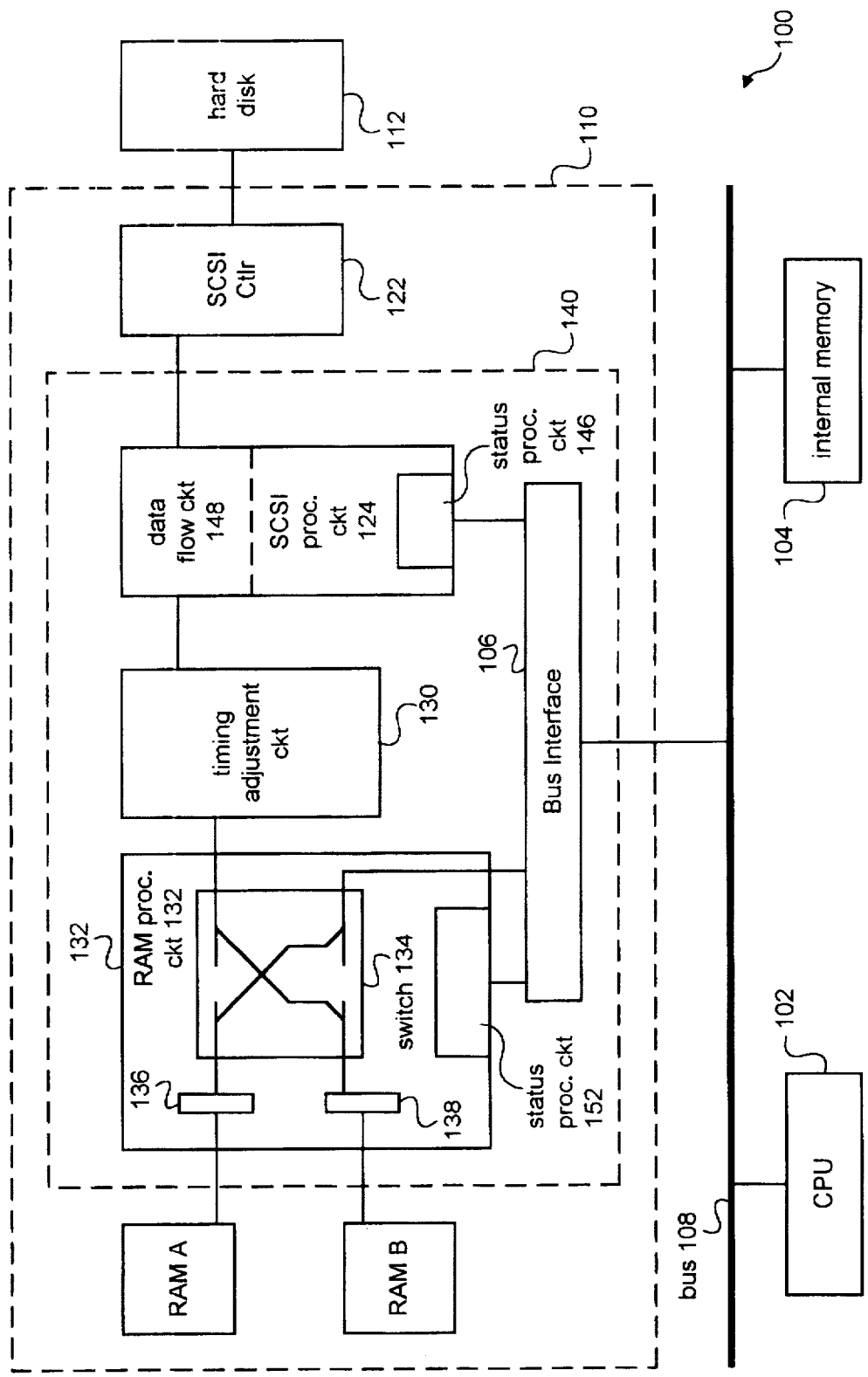
FIG. 1 is a block diagram of a computer system incorporating a data transfer device the present invention.

FIG. 1 is a block diagram showing a computer system 100 incorporating a data transfer device of the present invention. System 100 comprises a bus 108 connecting a CPU (central processing unit) 102, internal memory 104, and a data transfer device 110. In the present invention, bus 108 refers to one or more buses typically found in a computer system. Examples of buses are a system bus and peripheral bus (e.g., PCI, local bus, ISA, and EISA buses typically found in IBM compatible personal computers). In the present invention, internal memory 104 could be any memory addressable via bus 108. For example, memory 104 can be the system memory (typically connected to a system bus) or video memory (typically connected to a peripheral bus). Data transfer device 110 can be implemented as a peripheral board or encapsulated in a semiconductor chip. In one embodiment of the present invention, memory 104 and CPU 102 are connected to a system bus while device 110 is a peripheral board connected to an ISA bus.

Computer system 100 also comprises a hard disk 112 containing data. One aspect of the present invention is a system for rapidly transferring data between hard disk 112 and memory 104. As explained below, a pair of random access memory (RAM) inside device 110, labelled as RAM A and RAM B, is used to temporarily store the data transferred between hard disk 112 and memory 104.

The structure of data transfer device 110 is now described. Device 110 contains a bus interface 106 for connecting circuits inside device 110 to bus 108. Bus interface 106 allows data and control signals to be communicated between these circuits on one hand and memory 104 and CPU 102 on the other hand.

Device 110 contains a "small computer system interface" (SCSI) controller 122, which communicates data and control information with hard disk 112 in the standard SCSI protocol. The design of such a controller is well known in the art and will not be discussed here. SCSI controller 122 is preferably in the form of a semiconductor chip.

SCSI controller 122 is connected to a SCSI processing circuit 124. SCSI processing circuit 124 is connected to bus interface 106 and a timing adjustment circuit 130. SCSI processing circuit 124 performs the following operations: (1) receives commands and status information from CPU 102 via bus interface 106; (2) controls hard disk 112 (through SCSI controller 122) in accordance with these commands and status information; (3) in cooperation with timing adjustment circuit 130, transfer data to and from a RAM processing circuit 132; and (4) sends status information to CPU 102 via bus interface 106. For example, SCSI processing circuit 124 can activate and deactivate the transfer of data to and from hard disk 112. The status signals generated by SCSI processing circuit 124 could be used by a software driver which is designed to work with data transfer device 110. The operation of this driver will be explained in detail below in connection with FIGS. 2 and 3.

In this embodiment of the present invention, hard disk 112 conforms to the SCSI standard. However, the present invention is equally applicable to hard disks conforming to other standards, e.g., IDE (integrated drive electronics) or EIDE (enhanced integrated drive electronics).

In the present invention, data is not directed transferred between hard disk 112 and internal RAM 104 of computer system 100. Instead, data is temporarily stored in a pair of random access memory devices inside data transfer device 110 (shown as RAM A and RAM B). Data transfer by RAM A and RAM B is fast. On the other hand, data transfer by hard disk 112 is typically slow and not synchronous to the data transfer of RAM A and RAM B. Timing adjustment circuit 130 serves to coordinate and synchronize the hard disk and RAM A/RAM B data transfers.

In order to be able to achieve the above described functions, SCSI processing circuit 124 contains a status processing circuit 146 (for receiving, processing and generating status signals) and a data flow circuit 148 (for controlling the transfer of data to and from hard disk 112). The design of these circuits should be within the skill of persons skilled in circuit design art.

Timing adjustment circuit 130 is connected to a RAM processing circuit 132. This RAM processing circuit 132 is also connected, via bus interface 106, to CPU 102 and internal RAM 104. In addition, RAM processing circuit 132 is connected to RAM A and RAM B inside data transfer device 110.

RAM processing circuit 132 comprises a switch 134 for connecting RAM A and RAM B on one hand to timing adjustment circuit 130 and bus interface 106 on the other hand. Specifically, if it is desirable to transfer data between SCSI processing circuit 124 to either RAM A or RAM B, switch 134 causes timing adjustment circuit 130 to be connected to the appropriate memory. Similarly, if it is desirable to transfer data between internal RAM 104 to either RAM A or RAM B, switch 134 causes bus interface 106 to be connected to the appropriate memory device in data transfer device 110. It should be note that RAM A may be connected to either timing adjustment circuit 130 or bus interface 106 at a given time, but cannot be simultaneously connected to both timing adjustment circuit 130 and bus interface 106. Similarly, RAM B may be connected to either timing adjustment circuit 130 or bus interface 106 at a given time, but cannot be simultaneously connected to both timing adjustment circuit 130 and bus interface 106. Also, data cannot be directly transferred between timing adjustment circuit 130 and bus interface 106. The detailed operation of switch 134 in connection with the transfer of data will be described below.

In order to monitor the amount of data in RAM A and RAM B, RAM processing circuit 132 contains two byte processing units. Each unit contains a counter and means for matching the electrical signal between RAM A or RAM B and RAM processing unit 132. These units will be referred to as counters 136 and 138. RAM processing circuit 132 monitors the transfer of data from/to RAM A and RAM B and decrement/increment the value of counters 136 and 138, respectively. As a result, the values of counters 136 and 138 provide an indication of the amount of data stored in RAM A and RAM B, respectively.

Another function of RAM processing circuit 132 is to receive commands and status information from CPU 102 via bus interface 106. RAM processing circuit 132 then controls the transfer of data between internal RAM 104 on one hand and RAM A and RAM B on another hand in accordance with the received commands and status information. RAM processing circuit 132 may also send status signals to CPU 102.

These signals could be used by software modules which are designed to use data transfer device 110. A status processing circuit 152 is included in RAM processing circuit 132 to perform these functions.

Because it is desirable to optimize the access time of RAM A and RAM B, static RAMs are preferably used. However, other types of RAMs (such as dynamic RAM) could be used, and the present invention is not limited to a specific type of RAM.

The transfer of data between internal RAM on one hand and RAM A and RAM B on the other hand can be handled by CPU 102 directly (e.g., by issuing data transfer instructions to the CPU) or via conventional direct memory access (DMA). For processors which lack powerful data transfer instructions, such transfer is most efficiently handled by DMA. For processors which have powerful data transfer operations (e.g., burst mode transfer and string transfer instructions), such transfer is most efficiently handled by the CPU itself In one embodiment of the present invention, SCSI processing circuit 124, RAM processing circuit 132, timing adjustment circuit 130, and bus interface 106 are fabricated on a single semiconductor chip 140.

One of the functions of hard disk 112 is to store data and/or program used by application programs or operating systems. In order to fully utilize the advantages of device 110 in transferring data between hard disk 112 and the application programs (or the operating systems), a software driver is preferably used to coordinate the operation between them. This software driver can respond to status signals generated by device 110 and send commands thereto. This software driver can also send messages to an application software or the operating system.

Figure 2:
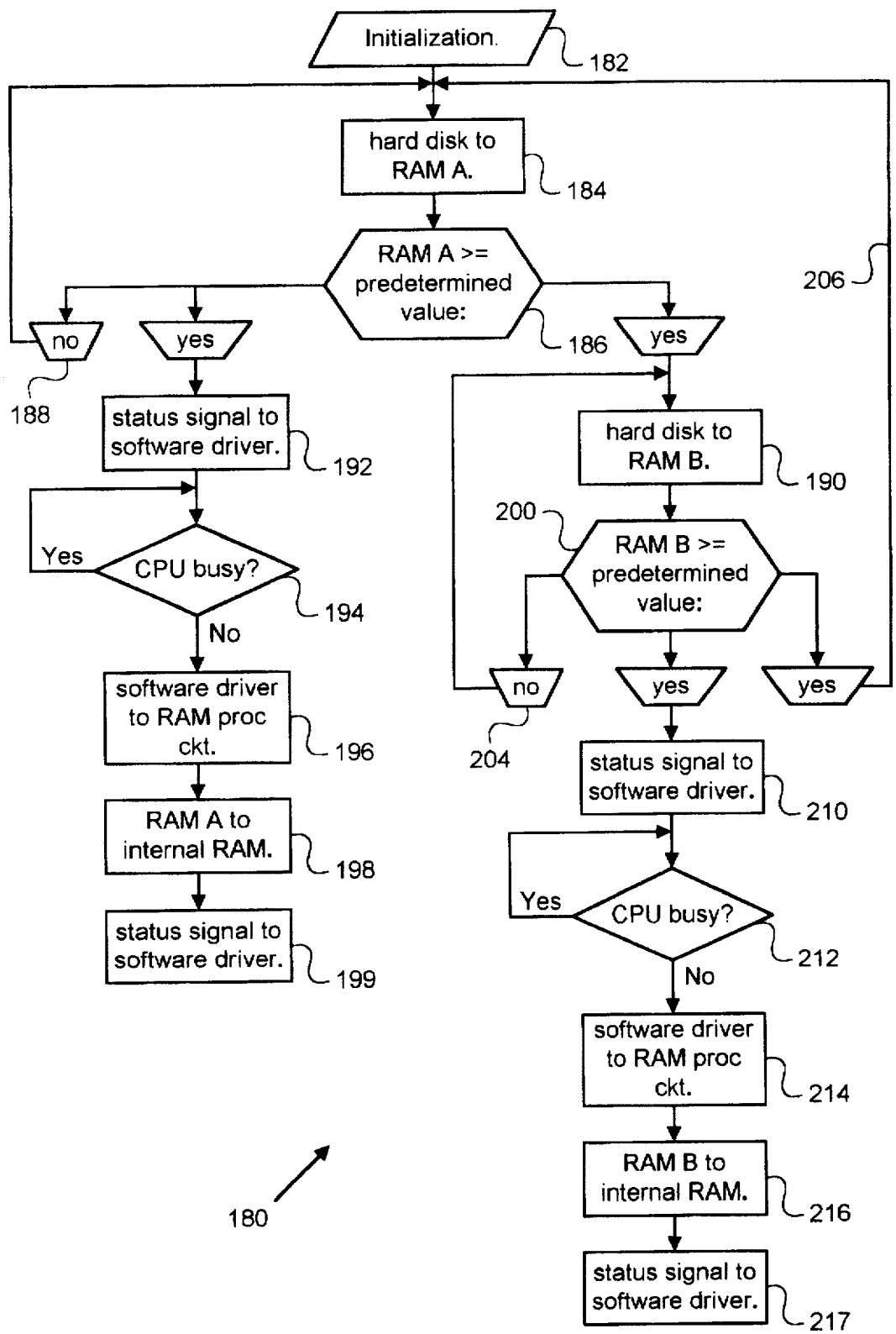
FIG. 2 is a flow chart showing the operation of the data transfer device in accordance with the present invention.

The operation of computer system 100 is now described. In a first example, an application software issues instructions to the software driver to retrieve a certain amount of data from hard disk 112 and transferred to internal memory 104. A flow chart 180 in FIG. 2 is used in connection with this example. The software driver issues an initialization command to SCSI processing circuit 124 and RAM processing circuit 132 (step 182). SCSI processing circuit 124 then initializes (through SCSI controller 122) hard disk 112 so that it is ready to retrieve and transfer data. RAM processing circuit 132 sets the values of counters 136 and 138 to zero and sets switch 134 to connect timing adjustment circuit 130 to RAM A. RAM processing circuit 132 retrieves data from SCSI processing circuit 124 (after processed by timing adjustment circuit 130) and transfers the same to RAM A. As a result, data is read from hard disk 112 and loaded into RAM A (step 184).

During step 184, CPU 102 is not involved. Thus, it can perform other functions, including executing Windows or other software modules.

RAM processing circuit 132 uses counter 136 to determine whether the amount of data in RAM A has reached a predetermined value (step 186). If this value is not reached (i.e., RAM A has room to accept additional data), data from SCSI processing circuit 124 (and hard disk 112) continues to flow to RAM A, after processed by timing adjustment circuit 130 (step 188). When RAM A is not able to accept data, RAM processing circuit 132 causes switch 134 to connect timing adjustment circuit 130 to RAM B. As a result, data is read from hard disk 112 and loaded into RAM B (step 190). At this time, RAM processing circuit 132 sends a status signal (e.g., an interrupt) to the software driver informing it that data in RAM A can be transferred to memory 104 (step 192). In step 194, the software driver then determines whether CPU 102 is busy (i.e., not ready to transfer data). If CPU 102 is busy in performing other tasks, the software driver will wait. If CPU 102 is available for processing data, the software driver sends a command to RAM processing circuit 132, which causes switch 134 to connect bus interface 106 to RAM A (step 196). At this time, data can be transfer from RAM A to internal memory 104 (step 198). Note that the above described step 190 (i.e., transfer data from hard disk 112 to RAM B) can be performed simultaneously with steps 192 to 198. Typically, the time for performing step 190 is longer than the time for performing steps 192–198. RAM processing circuit 132 can send a status signal to the software driver when step 198 (i.e., transfer data from RAM A to internal RAM) is completed (step 199). The software driver can then perform other tasks (or causes other software modules to perform other tasks).

Turning attention to RAM B, RAM processing circuit 132 uses counter 138 to determine whether the amount of data in RAM B has reached a predetermined value (step 200). If this value is not reached (i.e., RAM B has room to accept data), data continues to be loaded into RAM B from hard disk 112 (step 204). When RAM B is not able to accept data, RAM processing circuit 132 causes switch 134 to connect timing adjustment circuit 130 to RAM A again. Flow chart 180 branches back to step 184 via a path 206, and the above described steps regarding transferring of data to RAM A will be performed. At the same time, RAM processing circuit 132 sends a status signal to the software driver informing it that data in RAM B can be transferred to memory 104 (step 210). In step 212, the software driver then determines whether CPU 102 is busy (i.e., cannot transfer data out of RAM B). If CPU 102 is busy in performing other tasks, the software driver will wait. If CPU 102 is available, the software driver sends a command to RAM processing circuit 132, which causes switch 134 to connect bus interface 106 to RAM B (step 214). As a result, the data stored in RAM B can be transferred to internal memory 104 (step 216). As pointed out before, steps 210–216 could occur simultaneously with the transferring of data from hard disk 112 to RAM A. Typically, the time for transferring data from hard disk 112 to RAM A is longer than the time for performing steps 210–216. Upon completing step 216, RAM processing circuit 132 can send a status signal to the software driver (step 217). The software driver can then perform other tasks (or causes other software modules to perform other tasks).

The application software (through the software driver) determines the amount of data to be transferred from hard disk 112 to memory 104. The above described cycles continue until all the required data is transferred to internal memory 104.

Typically, the time to transfer data stored in RAM A and RAM B to internal memory 104 is very short when compared to the disk data transferring time. Thus, RAM A and RAM B are always available for disk data transferring because the data stored therein should have already been transferred to internal memory 104. If both RAM A and RAM B are not available for disk data transfer, the software driver should delay disk transferring operation until one of them is available.

Figure 3:
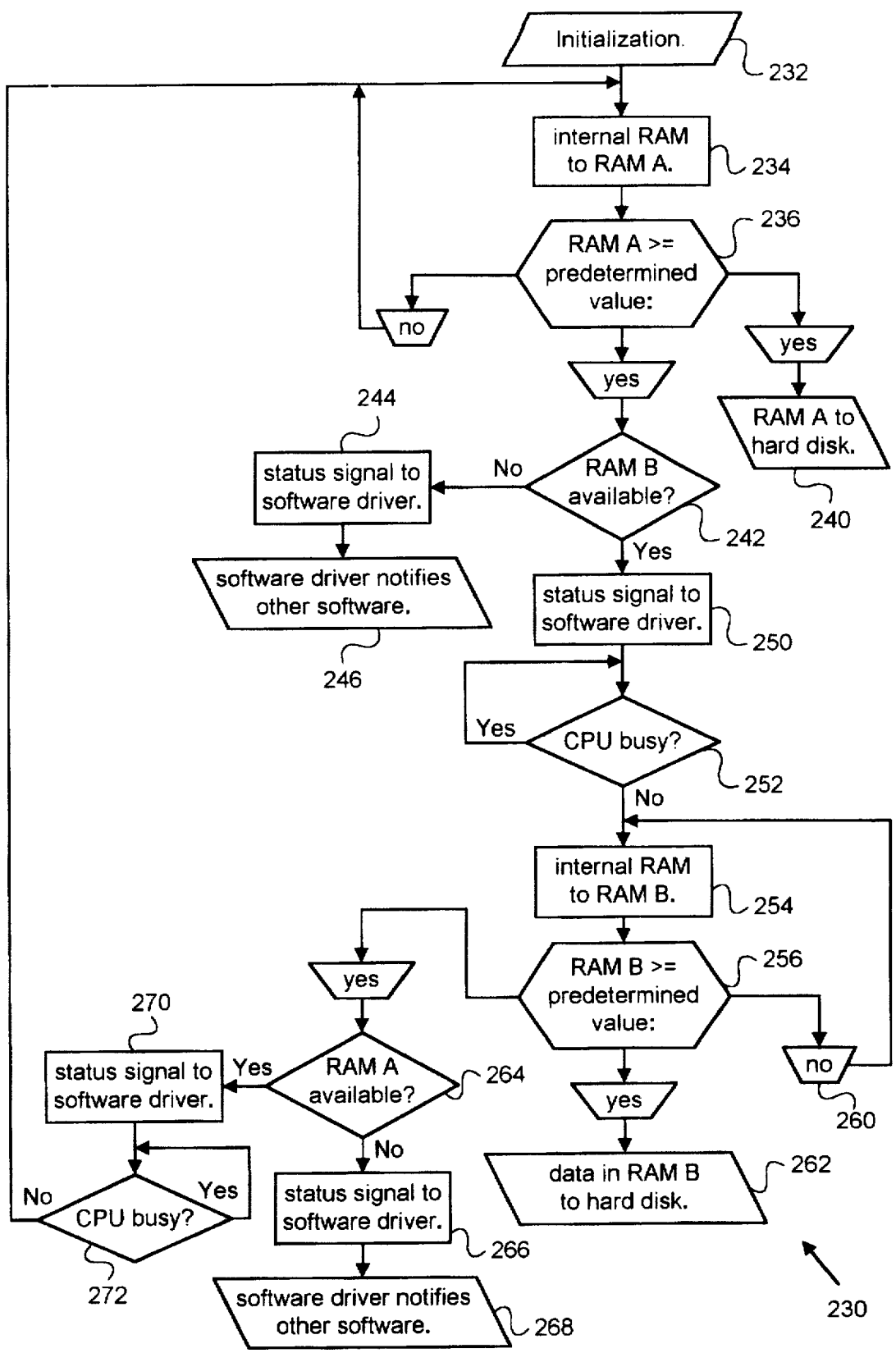
FIG. 3 is a flow chart showing another mode of operation of the data transfer device in accordance with the present invention.

In a second example, data is retrieved from internal memory 104 and stored to hard disk 112. A flow chart 230 in FIG. 3 is used in connection with this example. In this example, an application software issues instructions to the software driver, which causes data to be retrieved from internal memory 104 and transferred to hard disk 112. The software driver issues an initialization command to SCSI processing circuit 124 and RAM processing circuit 132 (step 232). SCSI processing circuit 124 then initializes (through SCSI controller 122) hard disk 112 so that it is ready to retrieve and transfer data. RAM processing circuit 132 sets the values of counters 136 and 138 to zero and sets switch 134 to connect bus interface 106 to RAM A. Data is transferred from internal memory 104 to RAM A (step 234).

Counter 136 is used to determine whether the size of data in RAM A has reached a predetermined value (step 236). If RAM A is able to accept additional data, data will continue to be retrieved from internal memory 104 and stored in RAM A (step 238). When RAM A is not able to accept additional data, RAM processing circuit 132 causes switch 134 to connect RAM A to timing adjustment circuit 130. SCSI processing circuit 124 transfers data from RAM processing circuit 132 to hard disk 112 under the control of timing adjustment circuit 130 (step 240). At the same time, RAM processing circuit 132 determines whether RAM B is available for storing data (step 242). When RAM B is being accessed for the first time, it should be available for storing data. However, it may not be available later because there may not be enough time to completely transfer the data stored therein to hard disk 112 (which is a relatively slow process) prior to filing up RAM A (which is a fast semiconductor-to-semiconductor transfer). If RAM B is not available, RAM processing circuit 132 sends a status signal to the software driver regarding the unavailability (step 244). Upon receiving the status signal, the software driver notifies the application software (or the operating system) to perform other tasks (step 246). If RAM B is available, RAM processing circuit 132 sends a status signal to the software driver regarding the availability (step 250). In step 252, the software driver determines whether CPU 102 is busy (i.e., not available to transfer data). If CPU 102 is not available, the software driver will wait. If CPU 102 is available, the software driver sends a command to RAM processing circuit 132 causing switch 134 to connect bus interface 106 to RAM B. Data is transferred from internal memory 104 to RAM B (step 254).

Counter 138 is used to determine whether the size of data in RAM B has reached a predetermined value (step 256). When the value is not reached (i.e., RAM B is able to accept additional data), step 254 is repeated and data will continue to be retrieved from internal memory 104 and stored in RAM B (step 260). When RAM B is not able to accept additional data, RAM processing circuit 132 causes switch 134 to connect RAM B to timing adjustment circuit 130. SCSI processing circuit 124 transfers data to hard disk 112 under the control of timing adjustment circuit 130 (step 262). RAM processing circuit 132 also determines whether RAM A is now available to accept data (step 264). If RAM A is not available (e.g., data has not yet been transferred to hard disk 112 because of the comparable low transfer rate), RAM processing circuit 132 sends a status signal to the software driver, which temporarily suspends the transferring of data from internal memory 104 (step 266). The software driver then notify the application software (or the operating system), which can now perform other tasks because there is no need to transfer data (step 268).

If and when RAM A is ready to accept data, RAM processing circuit 132 sends a status signal to the software driver (step 270). The software driver determines whether CPU 102 is busy (step 272). If it is busy (i.e., not available to transfer data), the software driver waits until CPU 102 is busy. If CPU 102 is not busy, RAM processing circuit 132 causes switch 134 to connect bus interface 106 to RAM A again. Data can now be transferred from internal memory 104 to RAM A. Flow chart 230 branches to step 234, and the whole algorithm is repeated again. The transfer of data from internal memory to RAM A can proceed simultaneously with the transfer of data from RAM B to hard disk 112.

The application software (through the software driver) determines the amount of data to be transferred from memory 104 to hard disk 112. The above described cycles continue until all the required data is transferred to hard disk 112.

One feature of the present invention is that the transfer of data from and to hard disk 112 is handled by data transfer device 110 instead of CPU 102. All CPU 102 needs to do is to issue high-level commands (e.g., start and terminate the transferring process) to data transfer device 110. There is no need for CPU 102 to monitor and process the details of the data transfer. As a result, CPU 102 can perform other tasks while data is transferred between hard disk 112 and RAM A or RAM B.

Figure 4:
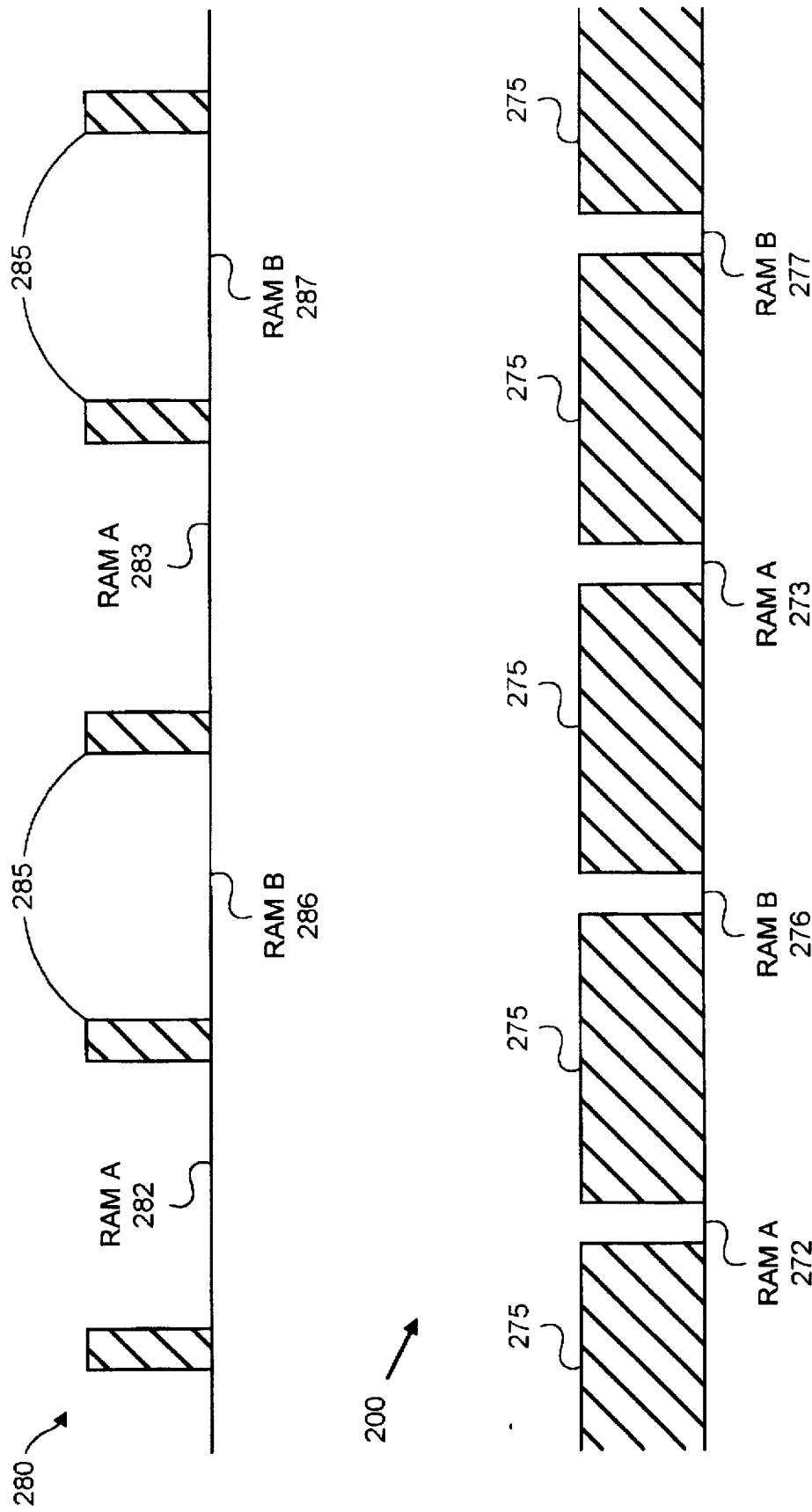
FIG. 4 shows the relative timing between various cycles during the operation of the data transfer device of the present invention.

FIG. 4 shows the relative timing between SCSI cycles and internal memory cycles of computer system 100 in FIG. 1. Timing diagram 280 shows the transfer of data between hard disk 112 and RAM A/RAM B. In FIG. 4, reference numerals 282 and 283 correspond to time intervals for transferring data between hard disk 112 and RAM A while reference numerals 286 and 287 correspond to time intervals for transferring data between hard disk 112 and RAM B. Time intervals for switching between RAM A and RAM B, designated as reference numeral 285, are much shorter than the time intervals for transferring data. This is because the switching is performed electronically using semiconductor elements in RAM processing circuit 132.

Timing diagram 270 shows the transfer of data between internal memory 104 and RAM A/RAM B. In FIG. 4, reference numerals 272 and 273 correspond to time intervals for transferring data between internal memory 104 and RAM A while reference numerals 276 and 277 correspond to time intervals for transferring data between internal memory 104 and RAM B. Note that the time intervals 272, 273, 276, and 277 (for internal memory transferring) are much shorter than time intervals 282, 283, 286 and 287 (for hard disk transferring). As pointed out above, computer system 100 can perform other functions (e.g., executing operating system or application programs) during time intervals 282, 283, 286 and 287 for hard disk transferring. As a result, the throughput of computer system 100 is much higher than conventional systems.

The size of RAM A and RAM B is a function of performance and cost. It is found that a memory size of 128 kilobytes for RAM A and RAM B gives adequate performance at reasonable cost. It should be appreciated that RAM A and RAM B could have different sizes, and that the full sizes of RAM A and RAM B do not have to be used. For example, the predetermined values in steps 186 and 200 of FIG. 2 and steps 236 and 256 of FIG. 3 could be less than the full size (e.g., 128 kilobytes) of RAM A and RAM B.

It should be appreciated that RAM A and RAM B are not cache memory. Thus, there is no need to include circuit for detecting hits and misses and for replacing a portion of the memory in accordance with the frequency of hits. The circuit of the present invention is simple and fast.

There are prior art systems which use buffers for the purpose of speeding up disk transfer. For example, many hard disks use semiconductor memory as buffers to improve throughput. Some computer systems use a portion of their system memory as buffers. However, these systems do not use the RAM A/RAM B architecture and the associated software driver. Consequently, their performance is inferior to the performance of the system of the present invention.

One of the applications of the present invention is to retrieve graphic files stored in a hard disk at high speed for use by Microsoft ("MS") Windows-based software applications. In many modern computer designs, a display memory (such as video RAM, or "VRAM") is used to store the digital image of information which will be converted to analog signals and displayed on a display device (such as a computer monitor). Under MS Windows, applications can appear as windows on a computer screen. The size of the windows could range from the full size of the monitor to a small fraction of the display area of the monitor. Thus, all or a small fraction of the display memory may be used to store the digital image.

The graphic file used to illustrate the present invention is a large file containing many megabytes of graphic data. It is stored in a hard disk. On the other hand, the size of VRAM in a typical computer system is around 1 megabyte. If the display window containing the graphic image is a small window, the amount of VRAM devoted to the digital image is much less than 1 megabyte. In both cases, the graphic file in the hard disk is much larger than the size of the digital image in the VRAM.

If it is desirable to scroll the image in the window, data of the graphic file stored in the hard disk needs to be downloaded to the display memory. The speed of scrolling is often limited by the speed of downloading of graphic data. Thus, it is desirable to have a system for fast transferring of data between the hard disk and the display memory.

In a variation of the above embodiment, system RAM is used as intermediate storage area because the available size of system RAM (typically at least four megabytes in computer capable of running MS Windows) can be larger than the size of the VRAM. The amount of graphic data retrieved from a hard disk and loaded into the system RAM could exceed the size of the VRAM. When the portion of the graphic data needs to be displayed differs only slightly from the graphic data being displayed in the display window, the graphic data can be transferred from the system RAM to the VRAM. As a result, there is no need to initiate disk data transfer in this situation. The transferring of graphic data between system RAM and VRAM is quite fast because the overhead in hardware and software for RAM to RAM transfer is quite low. Thus, this variation can increase the throughput to a certain extent. However, if the speed of scrolling is fast so that graphic data not yet loaded into the system RAM is frequently needed, disk data transfer cannot be avoided.

In the IBM compatible personal computer, hard disk operation is provided by a ROM based device service routine (DSR). This routine is part of the "basic input/output system" (BIOS) software, which composes of the operating system, device drivers and shell. The hard disk DSR is accessed by invoking an INT 13 function. The DSR communicates with and controls an industrial standard hard disk controller. It allows an application program to perform many operations to the hard disk, including read, write, initialize, test, format, etc. It also returns status information (e.g., error codes) to the application program.

Many software applications, including those operating in some versions of MS Windows, use INT 13 for the purposes of transferring data between a hard disk and system RAM. However, this method leads to very slow data transferring. One of the reasons is that the CPU needs to spend many cycles in executing MS Windows codes, thus cannot drive the hard disk to its maximum capability. As a result, the hard disk has to pause and wait for CPU cycles during data transfer. Another reason is that INT 13 and conventional hard disk interface require many CPU cycles to handle the transferring of data, thereby using valuable CPU resources for basic operations. As a result, the application programs will run slowly because they have to compete with the BIOS for CPU resources. In order to improve the data transfer between hard disk and the system RAM (or VRAM), the data transfer device of the present invention can be advantageously used in this system.

Figure 5:
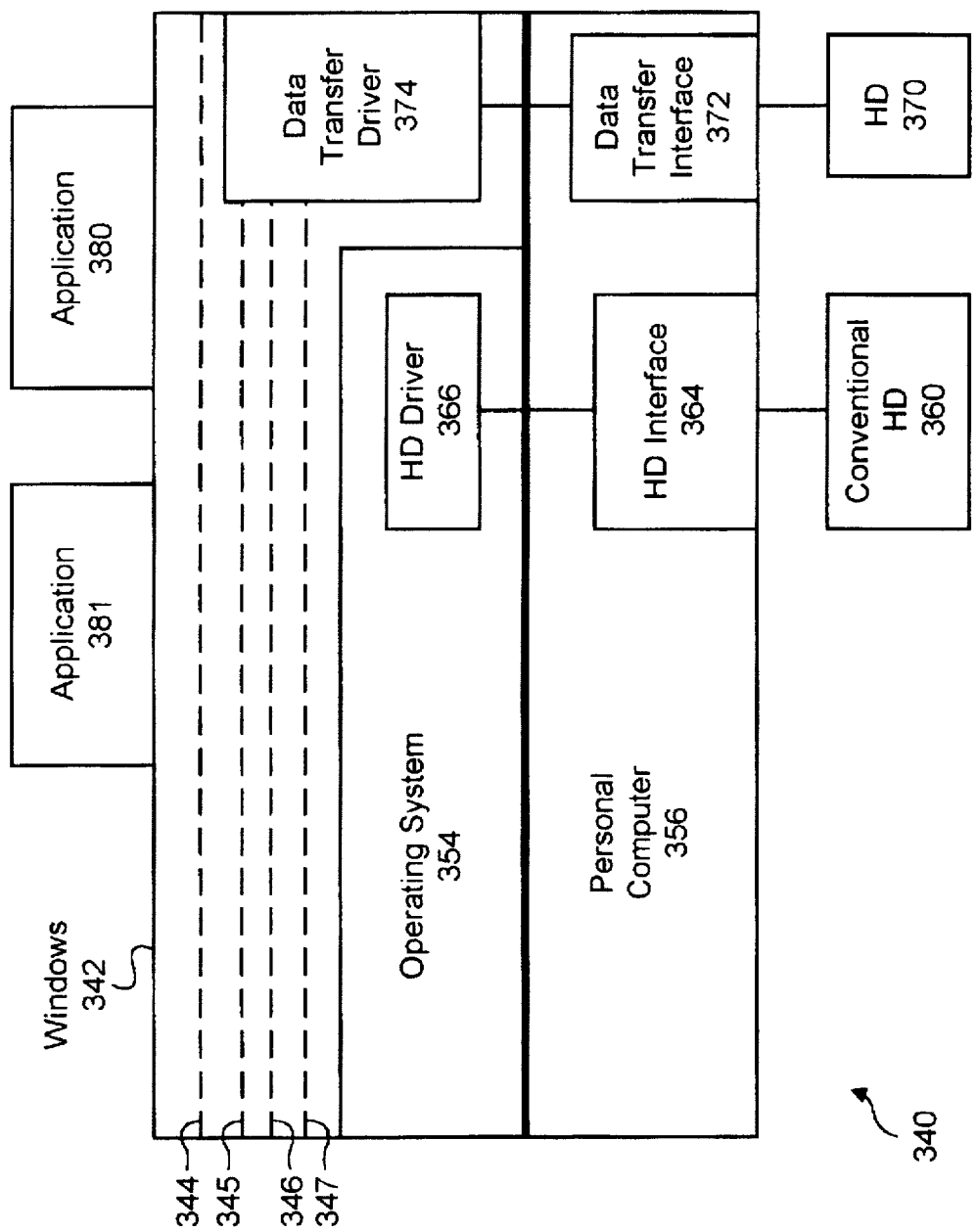
FIG. 5 is a block diagram of a computer system containing a data transfer interface and a software driver in accordance with the present invention operating in a Windows based environment.

FIG. 5 shows a schematic diagram of a computer system 340 designed to transfer graphic data using the present invention in a MS Windows environment. Computer system 340 comprises a personal computer 356 having a mother board (not shown), a monitor (not shown) and a keyboard (not shown). Computer system 340 also comprises MS Windows 342 running on top of an operating system 354 (such as Microsoft's MS-DOS working in combination with the computer's BIOS). Operating system 354 monitors and controls the resources of personal computer 356. MS Windows is a complicated software containing many program modules and layers of procedure calls, shown schematically in FIG. 5 as dashed lines 344–347.

System 340 also contains a conventional hard disk 360 connected to a conventional hard disk interface 364. This interface can be a printed circuit board inserted to a peripheral bus (e.g., an ISA or PCI bus) in personal computer 356. It contains electronic components (such as a hard disk controller chip) allowing personal computer 356 to control and communicate with hard disk 360. A conventional software program 366, typically called a hard disk driver, allows an application program to control and access hard disk 360 without knowing the details of the organization and structure of hard disk 360 and the hard disk controller. As pointed out above, hard disk driver could be embedded in the BIOS of computer 356. However, it is also possible to have a separate hard disk driver software running separately from the operating system.

Applications, such as an applications 380 and 381, run on top of MS Windows 342. In this example, one of the applications, such as application 380, is used to illustrate the present invention. Application 380 communicates with hard disk driver 366 through a lengthy chain of program modules in MS Windows 342 and operating system 354. Thus, in FIG. 6, HD driver 366 is shown schematically as a component positioned below dashed lines 344–347 and a portion of operating system 354. As pointed out above, prior art hard disk drivers are not efficient in transferring data to and from hard disk. In addition, communication between application 380 and hard disk driver 366 has to go through the MS Windows modules and at least a portion of operating system 354. As a result, data transfer is very slow.

The disk processing system in accordance with the present invention comprises a hard disk 370, a data transfer interface 372, and a data transfer (software) driver 374. Data transfer interface 372 corresponds to data transfer device 110 of FIG. 1. In the present invention, it is desirable to minimize the interaction between data transfer driver 374 on one hand and MS Windows 342 and operation system 354 on the other hand. It is found that this arrangement improves execution speed because less overhead is required. In FIG. 5, data transfer driver 374 is shown schematically to be positioned below only dashed line 344. Thus, application 380 can access data transfer driver 374 without going through a long chain of MS Windows modules.

In the present system, data transfer driver 374 comprises two program modules entitled FGB.DLL and MDC.DRV.

MDC.DRV is a driver program which controls hard disk 370 directly. FGB.DLL is a Windows dynamic link library module which provides an interface between application 380 and MDC.DRV. In this system, MDC.DRV replaces a conventional hard disk driver and associated disk-related routines embedded in operating system 354. MDC.DRV interacts with data transfer interface 372 in accordance with the flow charts in FIGS. 2 and 3.

Figure 6:
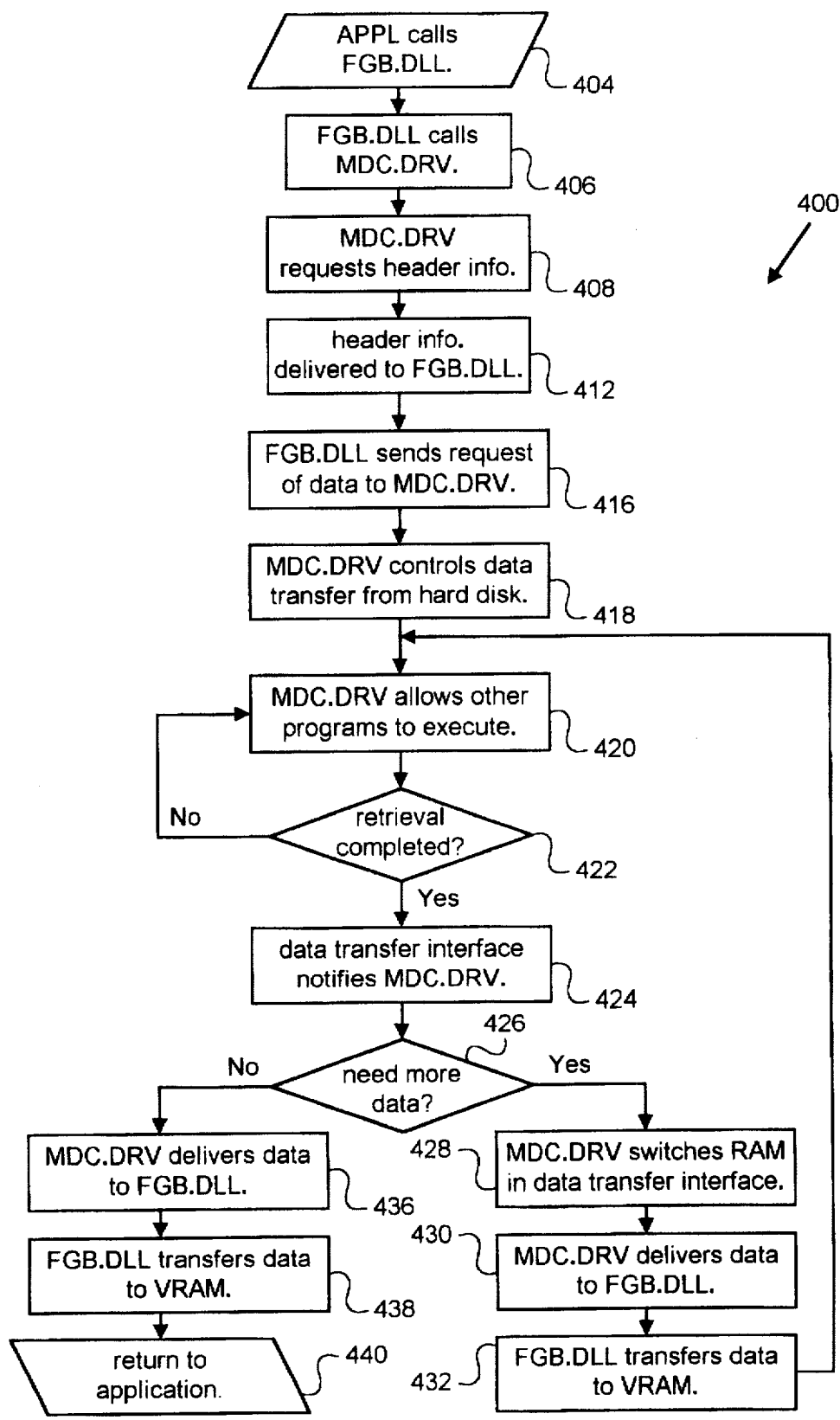
FIG. 6 is a flow chart showing the operation of the system shown in FIG. 5.

FIG. 6 is a flow chart 400 showing the interaction between application 380 with hard disk 370 in accordance with the present invention. In this illustrative example, it is assumed that the "predetermined values," shown in FIGS. 2 and 3, have been set to the full size (i.e., 128 kilobytes) of RAM A and RAM B. It is also assumed, for illustrative purposes, that graphic data is written into VRAM directly instead of using an intermediate storage medium such as the system RAM. Application 380 determines the size of the display window under MS Windows and the location of the associated graphic data file in hard disk 370 (e.g., directory\filename). Application 380 calls FGB.DLL and sends appropriate parameters thereto (step 404). Examples of the parameters are the directory\filename, size of graphic data desired, location of the window, etc. FGB.DLL then calls MDC.DRV (step 406). As pointed out above, MDC.DRV controls data transfer interface 372 directly without using operating system calls.

MDC.DRV sends commands to data transfer interface 372 to request header information from hard disk 370 (step 408). Header information is typically located at a predetermined position of hard disk 370, and contains information such as directory names, file names, size of each file, and the start address of each file. The header information is delivered to FGB.DLL via MDC.DRV (step 412).

Upon receiving the header information, FGB.DLL determines the location and size of graphic data needed to be send to the VRAM. In step 416, FGB.DLL sends commands to MDC.DRV requesting the required amount of graphic data from a specified location in hard disk 370. Because RAM A and RAM B are both 128 kilobytes in size, MDC.DRV then controls data transfer interface 372 to read 128 kilobytes of data from hard disk 370 (step 418). MDC.DRV notifies FGB.DLL or MS Windows to perform other tasks during the retrieval of data from hard disk 370 because this operation could take many CPU cycles (step 420). As a result, the retrieval of data can run concurrently with other MS Windows modules of other applications.

Data transfer interface 372 continues to monitor (through its counters) whether the RAM A or RAM B therein is full (step 422). If the hard disk has not yet retrieved the 128 kilobytes of data, the CPU resources can continue to be used by other software programs. When 128 kilobytes of data is retrieved, data transfer interface 372 notifies MDC.DRV (step 424). MDC.DRV determines whether more data needs to be retrieved from hard disk 370 (step 426). If more data is needed, MDC.DRV sends a command to data transfer interface 372 asking it to retrieve another 128 kilobytes of data from hard disk 370 and transfer to a different one of RAM A/RAM B (step 428). MDC.DRV delivers the previously retrieved 128 kilobytes of data (stored in RAM A or RAM B) to FGB.DLL (step 430), which in turn transfers the data to the VRAM (step 432). Flow chart 400 branches to step 420 (i.e., notifying and allowing other software to run).

If there is no need to retrieve additional data from hard disk 370, MDC.DRV delivers the previously retrieved 128 kilobytes of data (stored in RAM A or RAM B) to FGB.DLL (step 436), which in turn transfers the data to the VRAM (step 438). FGB.DLL returns to application 380 (step 440).

The division of labor between FGB.DLL and MDC.DRV can vary from that described in the above flow chart. In the above example, FGB.DLL informs MDC.DRV the required amount of data and let MDC.DRV makes decision to terminate the data transfer when the required amount is retrieved. In other embodiments, it may be desirable for this operation to be performed by FGB.DLL, i.e., FGB.DLL could make the decision to terminate data transfer. These and other variations should be easily made by a person skilled in programming, and will not be further described here.

MDC.DRV can also handle the transfer of data from VRAM or system RAM to hard disk 370. A flow chart for this situation can easily be drawn by persons skilled in the art using the information shown in flow chart 400 of FIG. 6 and flow chart 230 of FIG. 3. Consequently, this flow chart will not be shown here.

It can be seen from the above description that data transfer interface 372 (hardware) and the associated data transfer driver 374 (software) work synergistically to increase the throughput of data transfer between hard disk 370 and the VRAM (or system RAM). The hardware, standing along, is able to increase the throughput. However, the software driver allows other software applications and the operating system to fully utilize the resources of the computer.

The invention has been described with reference to a specific exemplary embodiment thereof. Various modification and changes may be made thereunto without departing from the broad spirit and scope of the invention. For example, the present invention could be used in various computers, both presently available and developed in future, such as Apple's computer and different versions of Microsoft's Windows (e.g., versions 3.1, 3.11, NT and Windows 95). The specification and drawings are, accordingly, to be regarded in an illustrative rather than a restrictive sense; the invention is limited only by the provided claims.

What is claimed is:

1. A system for transferring data between an external memory device and internal memory in a computer having a CPU, said CPU executing at least one application program, comprising:

a first memory device;

a second memory device;

a first circuit for communicating data with said external memory device;

a status signal circuit for generating status signals in response to activities in said first and said second memory devices and said first circuit;

a data switching circuit for alternatively coupling said first memory device to one of said first circuit and said internal memory and for alternatively coupling said second memory device to one of said first circuit and said internal memory; and a software routine executable by said CPU, comprising:
  means responsive to a first one of said status signals for determining a time period when said CPU is available to process said data and for causing said data switching circuit to couple one of said first and said second memory devices to said internal memory when said CPU is available so that said data can be processed by said CPU; and
  means responsive to a second one of said status signals for causing said one application program to be executed by said CPU during a portion of time when data is transferred between said external memory device and one of said first and said second memory devices.

2. The system of claim 1 wherein said software routine responds to a second one of said status signals for causing data to be transferred between said internal memory and said first memory during a portion of time when data is transferred between said external memory device and said second memory.

3. The system of claim 1 further containing a first counter coupled to said first memory device for determining an amount of data stored in said first memory device and a second counter coupled to said second memory device for determining an amount of data stored in said second memory device, said status signal circuit generating status signals when the amount of data stored in said first memory device exceeds a first predetermined value and when the amount of data stored in said second memory device exceeds a second predetermined value.

4. The system of claim 1 wherein said external memory device is a hard disk and wherein said first circuit further comprises a controller for controlling operations of said hard disk.

5. The system of claim 4 further comprising a timing adjustment circuit, coupled between said first circuit and said data switching circuit, for adjusting differences in transfer rates between said hard disk and said first and said second memory devices.

6. A method for transferring data between an external memory device and internal memory in a computer system, said system further containing a CPU, at least one application program being executed by said CPU, a first memory device and a second memory device, said method comprising the steps of:

providing a first switchable data transfer path between said first memory device and said external memory device and a second switchable data transfer path between said second memory device and said external memory device;

connecting, using said first data transfer path, said external memory device to said first memory device;

switching to said second data transfer path, when the amount of data in said first memory device exceeds a first predetermined value, to allow data transfer between said external memory device and said second memory device;

switching to said first data transfer path, when the amount of data in said second memory device exceeds a second predetermined value, to allow data transfer between said external memory device and said first memory device;

generating a first status signal;

determining, in response to said first status signal, a time period when said CPU is available to process said data;

causing said data switching circuit to couple one of said first and said second memory devices to said internal memory when said CPU is available so that said data can be processed by said CPU; and executing said application program during a portion of time when data is communicating between said external memory device and one of said first and said second memory devices.

7. The method of claim 6 further comprising the steps of:

providing a third switchable data transfer path between said first memory device and said internal memory device and a fourth switchable data transfer path between said second memory device and said internal memory device;

allowing data transfer between said internal memory and said first memory device using said third data transfer path only after said external memory device has been connected to said second memory device via said second data transfer path; and allowing data transfer between said internal memory and said second memory device using said fourth data transfer path only after said external memory device has been connected to said first memory device via said first data transfer path.

8. The method of claim 7 wherein said step of allowing data transfer between said internal memory and one of said first and said second memory devices occurs during a fraction of time needed for data to be transferred between said external memory device and one of said second and said first memory devices.

* * * * *